March 26, 1974  P. P. RATHKE  3,799,917
VINYL POLYMERIZATION BY BULK METHOD
Filed Feb. 15, 1972  2 Sheets-Sheet 1

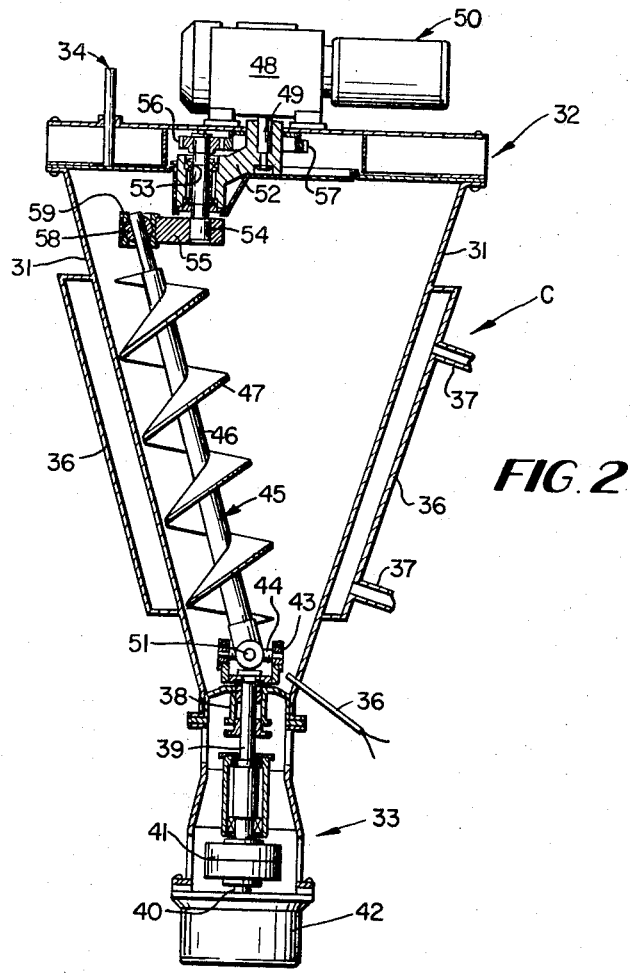
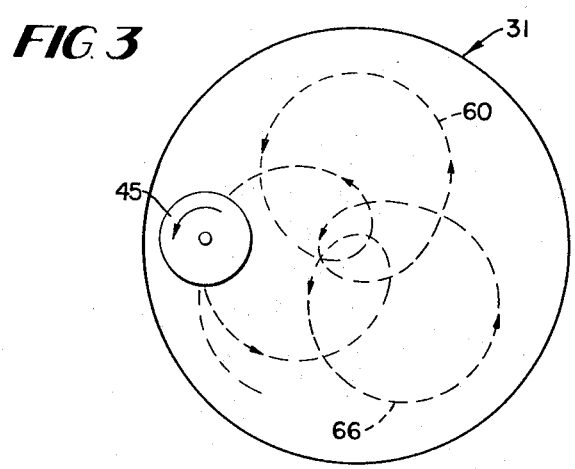

United States Patent Office 3,799,917
Patented Mar. 26, 1974

3,799,917
VINYL POLYMERIZATION BY BULK METHOD
Philip P. Rathke, Toledo, Ohio, assignor to
Owens-Illinois, Inc.
Continuation-in-part of abandoned application Ser. No.
111,496, Feb. 1, 1971. This application Feb. 15, 1972,
Ser. No. 226,416
Int. Cl. C08f 1/04, 1/98
U.S. Cl. 260—92.8 R
32 Claims

ABSTRACT OF THE DISCLOSURE

Vinyl chloride polymers are formed by a process employing a special reactor which has a generally frusto-conicaly shaped polymerization portion with a vertically disposed longitudinal axis and in which the polymerization is effected while an agitator is being moved within the frusto-conical portion to provide a desirable type of gentle, controlled mixing and agitation. The agitation is generally effected by employing one or more elongated shafts, each of which carries a plurality of helical screw flights thereon, which shafts are provided with motion within the reactor which has at least a rotational component, and in one embodiment has both rotational and radial dimensions. The moving shafts come into at least periodic proximity with the side walls. The shafts containing the plurality of helical screw flights are also revolved about their own axis. This process is especially suitable for the formation of polyvinyl chloride by bulk polymerization techniques.

CROSS REFERENCE TO RELATED APPLICATIONS

This application is a continuation-in-part of application Ser. No. 111,496, filed Feb. 1, 1971, now abandoned.

BACKGROUND OF THE INVENTION

Field of the invention

This invention relates to polymerization processes and more particularly, it relates to the formation of particulate polymers of the type which are insoluble in a liquid monomeric medium in which the polymerization is effected. Still more particularly, this invention relates to a novel method for the bulk polymerization of vinyl halide, and particularly the polymerization of vinyl chloride.

DESCRIPTION OF THE PRIOR ART

Various polymerization processes are known in the art wherein a polymer is formed in a polymerization atmosphere wherein the monomers, or mixture of polymerizable monomers, is maintained as a liquid with the resultant formation of a polymer which is insoluble in the liquid monomeric system. The bulk polymerization of vinyl halides, including the bulk polymerization of the vinyl chloride homopolymer as well as the bulk polymerization of copolymers of vinyl chloride with other compatible copolymerizable monomers, is well known in the art. In the bulk polymerization of vinyl halides, for example vinyl chloride, a monomer is typically put in a suitable polymerization reactor, so as to maintain it in a liquid condition, and in the presence of an effective polymerizing amount of an activating catalyst or initiator and under temperature and pressure conditions favorable to polymerization, the resultant polymer is formed which is insoluble in the monomer system, the monomer, of course, being depleted as polymerization proceeds. The polymerization may, of course, proceed to a suitably selected end point, at which point the polymerization, even if not entirely complete, may be stopped and the product isolated.

While those skilled in the art realize that relative to other polymerization processes, the product of a bulk polymerization process is generally substantially free of impurities and the process for producing this product is potentially efficient and economical, these benefits, especially the latter two, have not been fully achieved in the area of bulk vinyl polymerization. Thus, for example, a simple and economical bulk polymerization process for the formation of vinyl polymers, for example vinyl halides and especially vinyl chloride homopolymers, and copolymers of vinyl halides with compatible copolymerizable monoethylenically unsaturated monomers, has not yet become a commercial reality. The reason for this apparently resides in the fact that these types of bulk polymerization reactions are highly exothermic and with the free radical initiators employed proceed at a rate which is strongly dependent on temperature. Because of the foregoing characteristics of the reaction, along with the fact that severe problems with heat transfer are encountered throughout the reaction because of the viscosity increase in the system, these bulk polymerization processes have been very difficult to control. This lack of control creates special problems in the bulk polymerization of vinyl chloride, because of the difficulty of maintaining good heat transfer during the entire polymerization reaction wherein the reaction mass is a thick slurry at a conversion of about 15–20%, then proceeds to a wet cake at a conversion of about 25–30% and a powder after a conversion of about 45–50%. These control problems are obviously not conducive to the formation of a high quality product inasmuch as, for example, extensive localized heating may cause the formation of significant excessive amounts of skins and large thermally degraded aggregates which, of course, is undesirable. Poor process control also results in the formation of gels, or fisheyes, in the final product.

Attempts have been made in the art to resolve some of these difficulties but they typically employ the use of a plurality of reactors to accomplish the total polymerization and also require the use of different agitator speeds during the polymerization process with the initial agitation speed being quite high and thereby consuming large amounts of power. Thus, these attempts are not economically satisfactory in that they require substantial initial capital investments and the operating costs are also high.

SUMMARY OF THE INVENTION

With the foregoing in mind, it is the general object of this invention to provide for a simple and economical process, both from the point of view of initial capital investment and from the point of view of operating cost, for the bulk polymerization to produce high quality polyvinyl chloride.

In accordance with this invention, bulk polymerization processes, that is, the formation of a polymer in a liquid monomeric medium wherein the polymer is insoluble in the monomeric medium and wherein the monomeric medium is continuously depleted as polymerization proceeds, are effected in certain reactors which are designed to sustain superatmospheric pressures, for example, between about 100–150 p.s.i.g. and up to as much as 200–300 p.s.i.g. or even more, wherein the reactor has a generally vertically disposed longitudinal axis and includes a frusto-conical portion in which the polymerization reaction is conducted. Additionally, the polymerization reaction is conducted in the presence of a special gentle type of agitation, which is provided by one or more elongated agitators having a longitudinal axis inclined with respect to the vertical axis of the reactor and wherein the agitator axis is moved so as to have at least a rotational component, and in one embodiment, has both rotational and radial dimensions, within and about the vertical axis of the reactor; and wherein the agitator is also revolved, simultaneously with the rotational motion, about its own axis. Substantially along its entire length, the agitator carries along its external surface a plurality of coaxial helical screw flights with the direction of rotation of the agitator about its own axis being so selected that these screw flights function to effect a lifting action of the material in the reactor from the bottom proceeding toward the top generally in an inclined helical or spiral path. Because of the simultaneous motion of the agitator, about the vertical axis of the reactor and into and out of close proximity with the walls of the reactor, the material is also continuously moved within the reactor. Finally, there is also a gravitational flow of the material along the sides of the frusto-conical portion, generally in the area disposed intermediate the inner surface of the frusto-conical side walls and the edges of the helical screw flights. The configuration of the reactor and the types of agitation provided within the reactor, are surprisingly effective in the polymerization of vinyl chloride monomer in that the reaction mass is initially a liquid and then proceeds to a light slurry, a thick slurry, and finally to a wet cake and ultimately to a dry material. It is unexpected that the reactor could provide the thorough but gentle agitation necessary for the vinyl chloride polymerization to proceed satisfactorily through all the physical states and provide the excellent products and results of the present invention.

Thus, according to one feature of this invention, a liquid polymerizable vinyl chloride monomer along with a suitable polymerization catalyst or initiator is provided to the frusto-conical portion of a pressure-sustaining, enclosed reactor provided with one or more helical agitators and, under suitable conditions of temperature, pressure and time, the reaction is allowed to proceed to form a polymer which is insoluble in this liquid monomer system. This polymerization is effected while the agitator is simultaneously being moved about the axis of the reactor with movement which has at least a rotational component within the reactor, and while the agitator is being rotated about its own axis. Notwithstanding the fact that initially, the polymerizing medium is entirely liquid, then proceeds to a thin and thick slurry state, then to a wet cake state and then so far as a dry powder state, this entire polymerization process may be effected in this single reactor without the need for transporting any of the material during any stage of the polymerization to another reactor for further polymerization. An especially advantageous feature of this process is the ability to conduct the entire polymerization with low power consumption under conditions of constant agitation, i.e., at a constant orbital speed of the agitator and at a constant rotational speed of he agitator, thereby precluding the necessity of varying any of these speeds during prescribed stages of the polymerization reaction.

BRIEF DESCRIPTION OF THE DRAWINGS

The present invention, as hereinbefore described, will be more fully understood from the following more detailed description when considered in connection with the accompanying drawings wherein:

FIG. 2 is a vertical sectional view of a further embodiment of the invention and illustrates a reactor wherein the helical agitator provides epicyclic orbital movement within the reactor; and FIG. 3 is cutaway and simplified top plan view of the reactor of FIG. 2 and illustrates the epicyclic movement of the rotating agitator,

DESCRIPTION OF PREFERRED EMBODIMENTS

Figure 1:
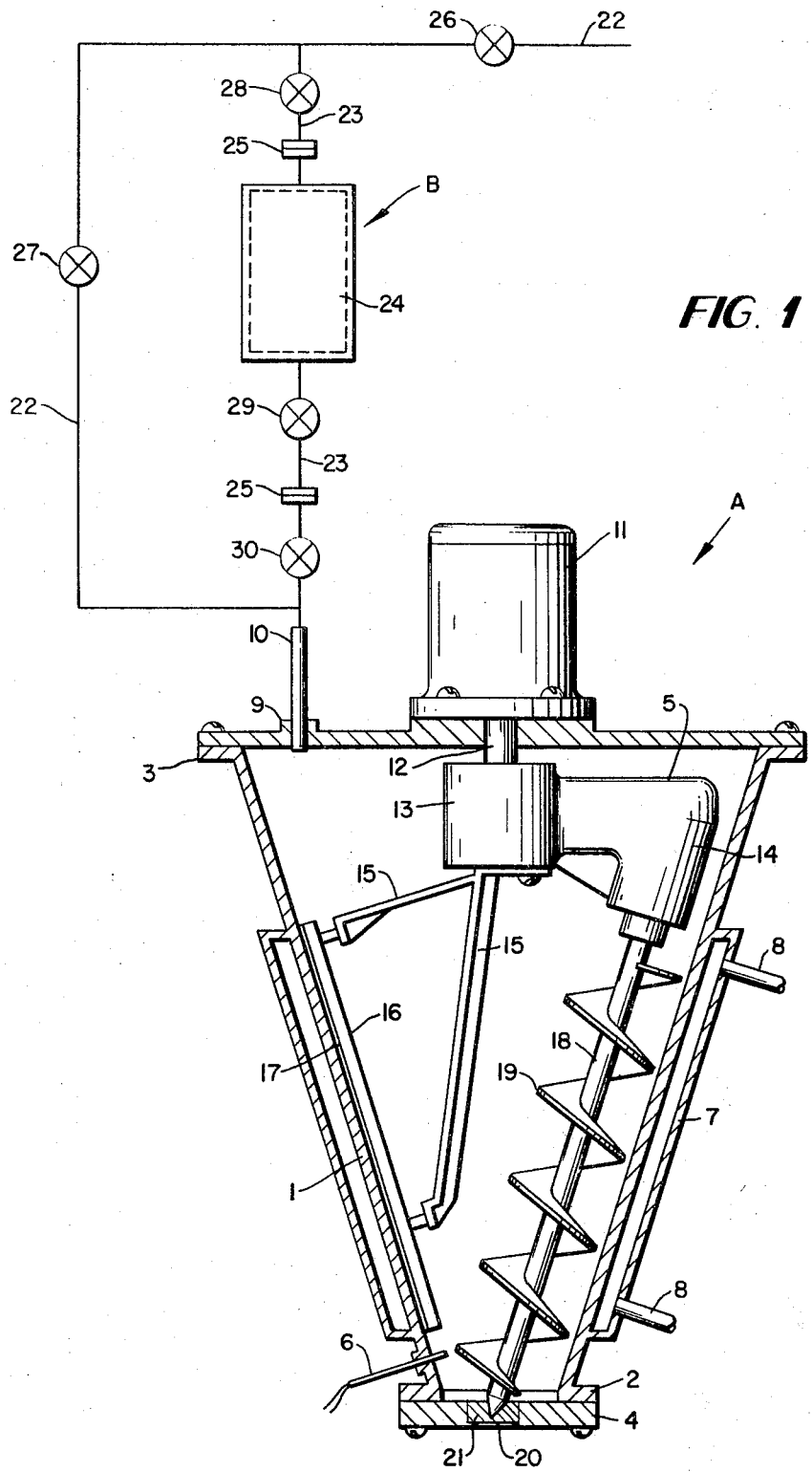
FIG. 1 is a vertical sectional view of a frusto-conical reactor illustrating one embodiment of the invention and wherein there is illustrated an agitated frusto-conical reactor suitable for use in the invention and there is also schematically illustrated in association therewith, suitable piping means for supplying polymerizale monomeric materials and suitable catalysts and initiators to the reactor.

In the bulk polymerization of bulk polymerizable vinyl monomers and especially vinyl chloride, which of course, also includes the formation of coplymers of vinyl chloride, the medium in which polymerization is effected is essentially a liquid monomer. That is, the system includes no substantial amounts of diluents, such as water, solvents or emulsifying agents. Under favorable polymerizing conditions of temperature, pressure, and in the presence of effective polymerizing amounts of suitable catalysts or initiators, polymerization is effected. The most common catalysts used are of the free-radical type but more complex catalysts may be used if desired. In the progress of this polymerization, wherein the polymer which is formed is insoluble in the monomer, the system first takes on a generally milky, or thin slurry consistency, then proceeds to a thicker slurry consistency and, finally, to a wet cake and ultimately, to a dry, particulate powder. It will thus be apparent that if any single reactor is to be economically and functionally useful in polymerizations of this type, wherein the material passes through the numerous stages as set forth above, its mode of operation must be capable of handling material in all of these stages.

The present invention provides a method with this capability as it has been discovered that the bulk polymerization of vinyl chloride to form polyvinyl chloride can be carried out in certain frusto-conical reactors provided with helical-type agitation therein. Thus in accordance with the unique method of the invention, the bulk polymerization of vinyl chloride is economically carried out with excellent results in controlling heat transfer problems and providing a free flowing particulate polymer material. As pointed out in more detail herein, these results are achieved when the bulk polymerization is conducted in the frusto-conical reactors with helical agitation employed in the method of the invention.

In meeting these advantages, it has been found that the conical portion of the reactor provides the desired heat transfer area per unit of volume and also provides inclined walls so that material is channeled in a converging manner to a lower portion of the reactor. The slow, orbit-like movement of the agitator about the axis of the reactor in a manner which has both rotational and radial characteristics serves the purpose of exposing fresh material to the walls for the desired controlled heat transfer. The rotational motion of the agitator about its own axis also provides many additional benefits. First of all, the rotation of the screw about its own axis facilitates the uniform exchange of materials adjacent the internal surface of the walls and supplements the action of the orbit-like motion to provide for good controlled heat transfer. Further, with the circular orbit, as the screw flights of the agitator are lifting material in one section of the reactor, material is flowing downward in another section so as to provide for self-cleaning along the side walls. Additionally, the lifting action of the screw prevents any significant detrimental packing of material at the bottom of the reactor which, of course, is extremely important in later stages of the reaction where wet cake or powdered materials are present, and thereby helps to eliminate any localized hot spots and degradation of the product. Additionally, in the latter stages of the reaction, if not properly handled, the solids forming in the bottom of the reactor will cause large agglomerates to form. Quite surprisingly, however, the agitation as provided in this invention precludes the formation of any such agglomerates, and results in free flowing, substantially spherical particulate polymer.

The present invention may be practiced in polymerizing bulk polymerizable vinyl compounds by employing temperatures, pressures, initiator or catalysis techniques heretofore practiced in these types of processes. Most advantageously, however, the invention is practiced in the polymerization of vinyl halides and, especially, the polymerization of vinyl chloride in bulk. The invention also, of course, is considered applicable to the copolymerization of vinyl halides and, especially, vinyl chloride with other copolymerizable compatible monoethylenically unsaturated monomers, including, for example, vinyl acetate, acrylonitrile, and halogenated ethylenes, such as vinylidene chloride, fluoroethylene and chlorofluoroethylene. Copolymers of vinyl chloride with the above type of copolymerizable monomer wherein the vinyl chloride is present in the liquid monomeric system in an amount in excess of about 60% and preferably 90 percent by weight, are especially well adapted to be formed by the process of the present invention.

Preferably the catalysts or other initiators heretofore employed in the art are used herein. For example, the peroxides, the peroxy dicarbonates, azonitriles, etc., all may be employed in the present invention in their usual effective polymerization amounts so as to allow for the bulk polymerization of the vinyl polymer. Suitable free radical polymerization initiators and amounts thereof which may be employed include, for example, lauroyl peroxide in an amount between about 0.2 percent to about 0.35 percent by weight based on monomer, di(sec-butyl) peroxy dicarbonate in an amount of about 0.02 to about 0.05 weight percent based on monomer, as well as di-isopropylperoxydicarbonate in an amount between about .02 to about .05 percent by weight based on monomer, di(2-ethyl hexyl) peroxy dicarbonate in an amount between about .02 to about .05 percent by weight, t-butyl peroxypivalate in an amount between about .03 percent to about .08 percent by weight based on monomer, and azobisisobutyryl-nitrile in an amount between about 0.1% and 0.3% by weight. Other suitable bulk polymerization initiators, for example, acetyl cyclohexyl sulfonylperoxide and diisobutyryl peroxide, will be readily selected by those skilled in the art. Mixtures of free radical initiators, as is well known, may also be employed.

Thus, as contemplated in this invention, bulk polymerization as herein described, is effected by providing a liquid bulk polymerizable vinyl chloride monomer in the frusto-conical portion of a reactor, whereby the liquid will, of course, take on the configuration of the frusto-conical portion and under conditions of temperature, pressure and in the presence of effective bulk polymerizing amounts of suitable polymerization initiators, the mass is converted into a polymer while undergoing a prescribed type of agitation. The agitation is provided by moving the axis of one or more inclined shafts containing a plurality of coaxial helical screw flights thereon, in an orbit-like path about the generally vertical axis of the frusto-conical portion and, simultaneously therewith, rotating the shaft about its own axis. The helical screw flights are generally of the same dimensions or radii for the entire length of the shaft. However, it is also within the scope of the invention to taper the screw flights if desired and this may in fact be necessary when two or more screws are used. The shaft containing the helical screw flights is preferably a helical screw adapted to be generally parallel with the conical sides of the reactor although it is not necessarily required. The helical screw is moved in a path about the axis of the reactor in a generally orbital manner, the movement having at least rotational, and sometimes both rotational and radial components. This orbital movement is such that at least periodically, and preferably at regular intervals within its predetermined path, the edges of the screw flight come into close proximity with the wall and preferably closely parallel thereto. By close proximity to the wall is meant that the screw comes within one-half inch or less of the wall and preferably about one-eighth to one-half inch. Obviously the screw can be in close proximity with only a small portion of the wall at a time. However, with the orbit-like motion of the screw as described herein, as the screw travels through its predetermined path it comes into close proximity with substantially all portions of the wall and therefore prevents material from building up on the walls. The expressions "orbit-like" and "generally orbital," as used herein to describe movement of the screw about the axis of the reactor, are considered to be generic to the several type of orbital movements described herein.

The polymerization may proceed to any desired degree of conversion and the entire polymerization may be effected in the single reactor. Likewise, there will be no need to vary either the orbit-like or the rotational speed of the agitator during the polymerization process. Suitable peripheral speeds of the edges of the rotating helical flights on the agitator which will produce the many benefits of this invention are less than about 5,000 inches per minute, with a range of about 900 to about 2,500 being especially preferred.

The polymerization of vinyl chloride is especially highly advantageously effected in accordance with this invention wherein liquid vinyl chloride is formed into a frusto-conical shape by dispensing the monomer into the frusto-conical portion of a reactor and, while agitating the monomer mass with an agitator having a shaft carrying a plurality of screw flights thereon wherein the shaft is first rotated about its own axis and secondly, and simultaneously therewith, it is moved generally in an orbit-like path within the frusto-conical shape, the monomer liquid is heated in the presence of an effective amount of a polymerization initiator to a suitable temperature, for example, in excess of about 100° F. and held at that temperature for a period of time sufficient to obtain a desired conversion to polyvinyl chloride. In a highly preferred embodiment of this invention, and in order to produce film grade resin, such as that suitable for use in making polyvinyl chloride containers by conventional blow-molding techniques, the mass is heated within the temperature range of about 120° F. to about 150° F. and, most desirably, between about 135° F. and about 145° F., and held at that temperature until the desired conversion, for example, at least about 50 percent, but preferably at least 70–80 percent, is obtained.

The process of the invention is particularly illustrated with respect to the several drawing figures accompanying the application. In the drawing various embodiments of apparatus are set forth which are preferably used in practicing the process of the invention. In each of the embodiments illustrated, however, it will be noted that the vinyl chloride polymerization of this invention is always conducted by forming the liquid vinyl chloride monomer into a frusto-conical shape and agitating the monomer by means of a helical screw which is also movable with the cone.

Referring now to the drawings in detail, there is generally shown in FIG. 1 a totally enclosed, sealed, super-atmospheric pressure-sustaining reactor A and a piping system B for supplying the needed reactants to the reactor. Conventional reactor design techniques, as well as conventional sealing techniques, are employed in the fabrication of the reactor to provide it with the capability of sustaining superatmospheric pressures such as, for example, pressures up to 200 p.s.i.g., or even higher. While the upper portion of reactor A may be of any suitable configuration, the lower portion, that is, the portion in which polymerization is effected, has a frusto-conical shape. This frusto-conical shape is defined by side walls 1, which are generally inclined with respect to the vertical axis of the reactor so as to define a lower discharge end of the reactor which has a diameter which is less than the diameter of the upper portions of the reactor. The lower portions of side walls 1 are provided with an annular flange 2 and the upper portions are provided with an annular flange 3. Annular flange 2 provides the support means for sealingly mounting a removable bottom wall 4 to the reactor and flange 3 serves as the support means for sealingly mounting a top wall 5 to the reactor. At the lower portion of the frusto-conical configuration of reactor A, suitable temperature sensing means are sealingly inserted such as, for example, thermocouple 6. Additionally, the frusto-conical portion of reactor A is externally provided with a conventional annular jacket 7 which includes conduits 8 fluidly communicating therewith whereby a suitable heat transfer medium may be circulated through jacket 7.

While top wall 5 of reactor A is generally shown in a simplified fashion, it will, of course, be apparent that conventional ports may be provided in the top wall. For example, venting ports, site ports, and ports for receiving pressure gauges and the like will generally be persent in top wall 5. As generally shown in FIG. 1, top wall 5 is provided with a charging port 9 into which is sealingly inserted a pipe 10 whereby materials may be charged into reactor A. If desired, it will, of course, be apparent that pipe 10 may be provided with suitable valve means. Mounted externally of reactor A and generally upwardly of the top wall 5 thereof is a main driving means 11 such as, for example, an electric motor. Main driving means 11 serves to rotate a main drive member 12 which extends through the top wall 5 in a sealed, rotatable manner. Carried by member 12 is a housing 13 to which is also connected an agitator-retaining arm 14. Housing 13 may also carry with it support arms 15 which serve to carry a wiper blade support arm 16 to which is mounted a suitable wiper blade 17. Wiper blade 17 is mounted in a suitable manner such as to provide a gentle wiping or scraping action of the internal surfaces of side walls 1 of reactor A. Thus, retaining arm 14 and the wiper blade are so mounted to the housing that upon rotation of member 12, these elements will rotate or orbit within the reactor about the generally vertically disposed axis thereof. Agitator retaining arm 14 rotatably carries a suitable screw-type agitator, generally diametrically opposite blade 17, which in the drawings is shown as an elongated shaft 18 whose longitudinal axis is inclined with respect to the vertical axis of the reactor and which is generally parallel to the side walls 1 of reactor A with shaft 18 carrying a plurality of helical screw flights 19 thereon.

In the preferred practice of this invention, the top level of the polymerization mass will usually be disposed beneath the upper helical screw flight. The agitator generally extends substantially to the bottom of the reactor and, as shown in FIG. 1, may be provided with additional support at the bottom thereof by being provided with a conical point 20 which is supported in a foot-bearing 21 carried by, for example, a recess in the removable bottom wall 4. The nature of the support in foot-bearing 21 is such as to allow for the agitator to be rotated about its own longitudinal axis while simultaneously allowing the shaft and its axis to be orbited in a generally circular manner within the reactor with the orbital motion of agitator retaining arm 14. Thus in this embodiment, the helical screw is in continuous proximity to the wall with its edges parallel thereto. While not shown in the drawings, it will, of course, be understood that disposed internally of agitator retaining arm 14, housing 13 and usually main drive member 12, are suitable inter-connecting means which provide for the rotation of the agitator about its longitudinal axis simultaneously with the orbital motion thereof.

In a preferred embodiment of the invention, the edges of the helical screw flights 19 carried by shaft 18 are disposed closely adjacent the internal surface of side walls 1. For example, they will typically be within one-half inch of the internal surface and more desirably, approximately one-fourth inch or less therefrom, e.g., one-eighth inch. Additionally, the rotation of the agitator is so selected that the helical screw flights will effect a spiralling lifting action of the material in the reactor proceeding from the bottom toward the top thereof. Obviously, therefore, the lowest helical screw flight will generally be disposed closely adjacent the discharge opening in the reactor, for example, closely adjacent the top internally disposed surface of bottom wall 4, so as to insure the lifting of substantially all the material in the bottom of the reactor and to prevent any substantial stagnation points therein.

As schematically illustrated in FIG. 1, pipe 10 communicates with a first monomer supply line generally designated 22 and with a second monomer supply line 23, the latter generally being in parallel fluid flow with respect to first monomer supply line 22. If desired, line 22 may be employed as venting line of the reactor or an additional line may be provided for this purpose. The second monomer supply line 23 carries with it an initiator or catalyst charging vessel generally designated 24 which may be in the simple form of a pipe whose opposed ends are closed with suitable caps having openings which fluidly communicate with line 23. The charging vessel, as will generally be seen in FIG. 1, may be installed in any suitable manner to allow for its easy removal and replacement within the line such as by employing removable couplings generally designated 25. Supply line 22 is provided with valves 26 and 27 and second supply line 23 is provided with valves 28, 29 and 30. The relationship of these valves is such that when it is desired to by-pass the charging vessel 24, all that is required is that valves 28 and 30 in line 23 be closed and valves 26 and 27 in supply line 22 opened, whereby a polymerizable monomer or mixture of polymerizable monomers will be supplied to pipe 10 through supply line 22. In order to supply monomer through line 23 to pipe 10, it will, of course, be apparent that valve 27 will now be closed, leaving valve 26 open and valves 28, 29 and 30 will likewise now be open. The latter mode of operation is advantageously employed to charge the initiator from the removable charging vessel 24 to the reactor and then to flush this charging vessel with monomer to insure that substantially all of the initiator has been introduced into the reactor. This latter mode also minimizes the possibility of allowing oxygen to enter the reactor during the initiator charging, which, of course, would tend to poison the reaction.

The frusto-conical portion of the reactor in which the bulk polymerization processes of this invention are carried out is particularly well adapted to these types of reactions because the reactor presents a high heat transfer area per unit of volume of material therein. Because of this beneficial heat transfer area per unit of volume, the reaction is much more readily controlled. The side walls 1 defining the frusto-conical portion will advantageously have an angle of inclination with respect to the vertical axis of the reactor of between about 10° to about 25° and, more preferably, an angle of inclination between about 15° to about 20°, with an angle of about 17° being especially well suited for these applications. With regard to the orbital rate of movement of the agitator axis within the reactor, it has been found that advantageously, this orbital movement or motion will be between about 0.5 to about 6 r.p.m., with a more preferred range being about 1 to 5 r.p.m. and, most desirably, the moving of the agitator axis in an orbital path within the reactor will be between about 1½ and 4 r.p.m. Advantageously, the rate of rotation of the agitator about its own axis, of course, as it is being simultaneously orbited within the agitator, will be between about 30 to 180 r.p.m. with a more desirable range being between about 60 to 150 r.p.m. and an especially highly preferred rotational speed being between about 90 to 130 r.p.m. Additionally, the axis of the agitator will generally be inclined with respect to the reactor's vertical axis by an angle which ranges between about 10 to about 25° and, more desirably, between about 15 and 20°. In a highly preferred embodiment of this invention, the axis of the agitator will be generally parallel to the side walls 1 defining the frusto-conical portion of the reactor and will generally be inclined with respect to the vertical axis of the reactor by an angle of about 17°. While the number of coaxial helical flights carried on the shaft which defines the agitator may vary over a wide range, it is particularly convenient to employ a number of helical screw flights such that the ratio of the number of screw flights per gallon of capacity of the frusto-conical portion of the reactor (as measured to approximately the top screw flight) will have a value between about 0.005 to about 0.6. A helical screw flight pitch of between about 3 to about 15 inches is particularly suitable with a pitch of about 4 to about 14 inches being highly preferred. The diameter of helical screw flights 19 is preferably selected to be between about one-sixth to one-half, and most desirably, about one-fifth to one-third, the maximum diameter of the frusto-conical portion. The diameter of the bottom opening will then generally be selected to be slightly larger than the helical screw diameter so as to allow the agitator to be easily moved within the reactor. Particularly suitable helical flight diameters are between 4 inches to about 16 inches, with about 5 inches to about 15 inches being highly preferred.

In the usual practice of the invention, the amount of material in the reactor during any stage of the reaction, will generally be such that the upper helical screw flight will be disposed upwardly of the upper level of this material to insure the most effective utilization of the desired special mixing action provided in the reactor.

Of course, if desired, the reactor may be adapted to practice evaporative cooling techniques which are well known in the arts and especially the polymerization art.

A particularly important embodiment of the present invention, and one that is specific within the broad concept disclosed, resides in use of the reactor illustrated in FIGS. 2 and 3, which reactor has the advantage of eliminating any dead zone in the center of the conical reactor during the vinyl chloride polymerization. As compared with the reactor of FIG. 1, this particular apparatus provides epicyclic orbital agitation in the conical reactor and eliminates the possibilities of dead zones in the reactor. Both types of reactors however provide for a rotational component of motion about the reactor axis, that is, both move in an "orbit-like" manner. Accordingly, the heat transfer in the reactor is improved which serves to potentially reduce local overheating and therefore, the possibility of gel and fisheye formation is substantially minimized. This particular reaction system also provides the added feature of direct total mixing. These features are attained by the epicyclic orbital motion of the helical screw as it moves into the center of the reactor and then moves back to the wall of the reactor. As may be seen in the top view of FIG. 3, this motion, together with rotation of the agitator about its own axis, provides general agitation throughout the entire volume of the frusto-conical reactor. It will be noted that whereas the reactor of FIG. 1 was in continuous close proximity to the wall, the reactor of FIGS. 3 and 2 is only in periodic proximity to the wall. However, the epicyclic motion is such that close proximity with the wall is obtained while gaining other advantages described.

In this reactor, the frusto-conical apparatus is provided with a helical screw which is rotated about its own axis so as to move the material within the reactor in the direction of the length of the helical screw. Moreover, means are provided to make the helical screw follow an orbit-like path within and relative to the frusto-conical reactor with a motion having both a rotational component about, and a radial component to and from, the axis of symmetry of the reactor. This therefore provides the desired and unusual epicyclic motion which has been found to provide unexpected advantages in the vinyl chloride polymerization reaction.

Referring now more particularly to FIG. 2, it will be seen that there is provided a frusto-conical reactor C which is defined by side walls 31, top portion 32 and bottom portion 33. There is further provided an inlet port 34 designed for interconnection with the piping and feed apparatus described in FIG. 1 through which the vinyl chloride monomer may be charged to the reactor. This reactor may be taken apart for removal of solid polymer or provided with a port for example near the bottom of the reactor for removal of the polymer. The reactor is additionally provided with a conventional annular jacket 36 which includes conduits 37 which fluidly communicate to provide a suitable heat transfer medium for circulation through the jacket for heating and cooling of the reaction. The reactor is also provided with temperature sensing means such as thermocouple 36 for sensing the temperature in the reactor.

The upper end of the conical reactor is securely closed by conventional sealing techniques so that the reactor will provide the capability of sustaining super-atmospheric pressures of up to 200 p.s.i.g. or higher. This may be achieved, for example by the use of suitable bolt means for connecting the top flange to the top portion of the reactor.

Secured at the lower end in the apex of the reactor on the axis of symmetry is a universal joint 51, this joint being carried in a bearing 38 by a shaft 39 secured at the end remote from the joint 51 through the intermediary of driving shaft 40 and flexible or sliding coupling 41 to a suitably geared electric motor 42. The coupling is preferably in a form of a limited slip clutch so as to insure that the motor is not accidentally overloaded.

Universal joint 51 comprises a bifurcated member 43 supporting a pivot end 44 which in turn is secured to the bottom end of the helical screw 45. As in FIG. 1, the helical screw 45 comprises a central main shaft 46, having thereon a spiral flight 47, arranged to provide the desired pitch and helical motion in the reactor.

As indicated the upper end of the reactor is closed in such manner that a reduction gear unit 48 may be supported above the reactor on the axis of symmetry of the reactor. This reduction gear unit 48 carries a downwardly directed driving spindle 49, adapted to be rotated by an electric motor unit 50, drivingly engaged with the reduction gear unit through a suitable clutch mechanism.

Secured to the driving spindle 49 is a radially disposed rotary driving arm 52 which in turn carries a bearing 53 for receiving a driving shaft 54 for supporting and causing rotation of the screw arm 55 attached to the top end of the helical screw 45. The shaft 54 that carries this screw arm 55 passes upwardly through the driving arm 52 on the driving spindle 49 and carries a gear wheel or pinion 56 which is rotated as a result of its engagement with a fixed cooperating gear wheel 57. A connection between the screw 45 and the screw arm 55 is arranged by passing the helical screw through a spherical collar 58 located within a spherical rebate 59 at the free end of the screw arm 55.

In operation, rotation of the driving spindle 49 under the influence of the electric motor unit 50 causes the driving arm 52 to rotate so that it rotates around the vertical axis of symmetry of the reactor C. This rotation causes the shaft 54 carrying the screw arm 55 to rotate about its own axis as a result of the gear wheel 56 meshing with cooperating gear wheel 57 and this axial rotation of the shaft 54 causes rotation of the screw arm 55 carried thereon and the end of the helical screw 45 secured thereto will thus follow a path within the reactor, the path being a motion including both a rotational component about and a radial component to an from the axis of symmetry of the reactor.

The screw 45 is also rotated about its own axis by means of the motor unit 42 causing rotation at the universal joint 51 at the lower end of the reactor. Thus, it will be appreciated that the path followed by the helical screw insures that the material being reacted within the reactor moves in a direction along the helical screw 45. Furthermore, the rotational and radial components of the motion about the axis of symmetry insures that all parts of the reactor are included within the range of the helical screw so that thorough and intimate reaction takes place with the absence of dead zones within the reactor.

This unusual motion is particularly illustrated in FIG. 3 wherein a simplified top view of the epicyclic orbital motion is described. As may be seen in FIG. 3, sides of the reactor are indicated generally at 31, with the helical screw being indicated generally at 45 in accordance with FIG. 2. As may be seen in the dashed lines 60, with arrows indicating the direction of motion, the helical screw rotates about its own axis within the reactor in the epicyclic path so as to cover substantially the entire space within the reactor and thereby provide the necessary gentle agitation throughout the reactor as it moves into the center and back out to the walls of the reactor in the indicated fashion.

Quite obviously, the reactor of FIGS. 2 and 3 can be modified to provide different types of mixing but all will use the preferred epicyclic movement. For example, one end of the helical screw, such as the bottom or apex end could be restrained against radial movement while permitting the screw to rotate about its own axis and the other end of the helical screw could have a motion with both rotational and radial components with respect to the axis of symmetry of the reactor. Alternatively, both ends of the helical screw could be arranged to follow geometrically similar or dissimilar paths. These alternatives could be achieved by use of a crank arm interposed between the universal joint and the end of the helical screw or alternatively, the crank arm could be positioned between the universal joint and the reactor. However, while the reactor of FIG. 2 could be varied in many ways, the apparatus illustrated is preferred.

An alternative embodiment of the present invention permits an increase in the capacity of the frusto-conical reactor while still maintaining the same method of mixing within the reactor. Thus in this embodiment, the gearing usually required in the top or head space of the reactor, which is necessary to drive the helical screw, is eliminated by providing driving means for the helical screw at the bottom of the reactor.

In a reactor of this type, which is of course similar to that of FIG. 1, separate drive means are provided at the top and bottom of the reactor. The helical screw is driven by a screw drive means located at the bottom of the reactor which serves to rotate the helical screw about its own axis. Any type of configuration may be used to achieve this technique but in one embodiment an oil seal combined with a double mechanical seal may be utilized to effectively seal the bottom of the reactor against loss of pressure therein. An electric motor is utilized to rotate the helical screw through suitable and known means such as a universal joint and a drive shaft so as to provide the desired screw rotation within the reactor. Simultaneously, an electric motor disposed at the top of the reactor provides orbital rotation of the helical screw within the reactor. For example, a central housing member having one arm attached to the top of the helical screw so that rotation of the housing causes the helical screw to revolve within the confines of the reactor. In a preferred procedure an arm on the opposite side of the housing from that attached to the top of the screw is provided for attachment to a full length scraper which scrapes the sides of the reactor to ensure that all the material is thoroughly mixed. This reactor may be further provided with an annular jacket for effecting cooling or heating of the reactor and a convenient method of controlling the temperature is by use of a thermocouple disposed in the central housing member.

The technique of using a driving means at the bottom of the reactor to rotate the helical screw member has the advantage of eliminating the gearing necessary to drive the helical screw at the top and thereby increasing the usable space within the reactor. This particular embodiment eliminates the swing arm 14 as shown in FIG. 1 and results in a gain in operating capacity. Thus when the helical screw is driven by the gear means attached to the bottom of the reactor, it thereby increases the available operating volume.

A still further embodiment of the invention which may be practiced is to use at least two helical screws within the reactor to achieve the agitation therein. The advantage of a plurality of helical screws, as opposed to a single screw, is that added agitation is provided as the reactor size increases. In addition, this embodiment provides advantages in choice of modes of agitation, as one screw could be parallel to the wall while the other helical screw could be inclined at an angle between about vertical and about the angle of the wall, preferably about half-way between. The advantage of the multiple helical screw aspects provides insurance against the possibility of dead zones in that it permits agitation of any central dead zone which is often associated with an orbiting helical screw which is parallel to the wall. While any number of solid helical screws can be used to achieve mixing in the pressure reactor, it is preferred to use two of the helical screws with one parallel to the wall and the other inclined between the vertical and wall angle and also preferably orbited within the reactor to achieve the total mixing required. Where two screws are used the screws may be of the tapered type to provide space for movement in the bottom of the reactor. Epicyclic motion of one or both screws within the reactor may be achieved using the principles outlined with respect to FIGS. 2 and 3. The use of the multiple helical screws in the reactor provide improved agitation and therefore improvement in polymer properties.

In order to allow those skilled in the art to more fully understand the invention and to assist them in making and using the present invention, the following examples are given, not by way of limitation but rather by way of illustration. The reactors employed in these examples are of the type previously described with the frusto-conical polymerizing reaction portion having a volume of about 13 gallons as measured from the discharge opening to about the level of the uppermost helical screw flight. Monomer charges were such that the dry powder volume (about twice the volume of the liquid charge) produced during the reaction would have an upper level disposed beneath the upper helical screw flight. The discharge opening of the reactor had a diameter of about 7 inches and the side walls had an angle of about 17° with respect to the vertical. The helical screw flights coaxially mounted on the shaft had a diameter of about 6 inches and a constant pitch of about 5 inches with the edges thereof being about one-fourth to about one-eighth inch from the internal surfaces of the side walls defining the frusto-conical portion. Additionally, the longitudinal axis of the agitator shaft was parallel to the inclined side walls. The reactor used in Examples 1-8 was of the type described in FIG. 1.

EXAMPLE 1

A homopolymer of vinyl chloride was produced by the following procedure. In this example, the charging vessel, as hereinbefore described, was not employed and the top wall of the reactor was provided with an additional charging port. The reactor employed had a nominal 13 gallon capacity as measured to the top of the uppermost helical screw flight.

The sealed reactor was purged of air by charging vinyl chloride monomer thereto from a hold tank under a nitrogen head of approximately 100 pounds. After the purging, there remain in the reactor vinyl chloride vapor under a pressure of about one atmosphere or slightly above. Subsequently, there was charged through a charging port in the top wall about 69.3 grams (about 0.28 weight percent based on total polymerizable vinyl chloride) of solid lauroyl peroxide at room temperature. Twenty-one (21) kilograms of vinyl chloride monomer were then charged into the reactor while the main drive means was activated such that the longitudinal axis of shaft 18, and the helical screw flights, rotated at a rate of approximately 116 r.p.m. and the orbital rate of the shaft within the reactor was about 3.9 r.p.m. After the completion of this charging of vinyl chloride, the reactor was again vented to remove traces of oxygen leaving approximately 20 kilograms of polymerizable vinyl chloride therein. Water at a temperature of about 200° was then introduced into the annular jacket while the agitator was moving at the orbital and rotational speeds mentioned above until the temperature reach about 125° F. (51.8° C.). During this heat-up, it was noted that a milky liquid had formed, thus evidencing product formation. Once the temperature had reached about 125° F., a temperature controller was used to maintain the temperature (actually about 125° F. plus or minus 2½° F.). Three hours after reaching the 125° F. polymerization temperature, it was noted that a thick slurry had been formed and that the pressure was generally between about 106 to about 112 p.s.i.g. This thick slurry then proceeded to a wet cake state and then to a dry powdery state. About 10 hours after reaching the reaction temperature, there was a pressure drop of about 10 p.s.i.g., at which time the reaction was discontinued. The reactor was vented to remove unreacted monomer and to allow the reactor to reach atmospheric pressure. Tap water was also circulated trhough the annular jacket to cool the reactor. The removable bottom wall 4 was then disengaged from the reactor and the batch dropped therefrom. The amount of particulate polyvinyl chloride homopolymer was equivalent to an 81 percent conversion based on the 20 kgm. vinyl chloride monomer charge. After scalping through a 20 mesh screen (scalping yield of 72.5 percent, based on the 20 kgm. vinyl chloride monomer charge), the scalped material was evaluated for its properties. The material had an apparent density of 0.405 gram per cc. as measured by ASTM-D-1895-65T. The particle size of the scalped material was as set forth below:

| U.S. Screen No.: | Weight retained on screen, percent |
|---|---|
| 30 | 3.8 |
| 40 | 47.0 |
| 50 | 12.3 |
| 80 | 24.2 |
| 100 | 2.8 |
| 120 | 2.7 |
| 140 | 2.1 |
| 200 | 2.8 |
| Pan | 2.3 |

The number average molecular weight as determined by a Water's Gel Permeation Chromatograph (Model 200) was 37,200 (using a Styragel packing and tetrahydrofuran solvent at 25° C. at a sample concentration of 0.25% by weight) and the inherent viscosity of the same scalped product as determined by ASTM-D-1243-66 was 0.911 with tetrahydrofuran solvent at 30° C. at a concentration of 0.2 gram per 100 ml. The material had a volatiles content of 0.14 percent. The scalped material was also compounded and blown into bottles using conventional blow molding techniques.

EXAMPLE 2

Again using a charge of approximately 0.28 percent of lauroyl peroxide based on total vinyl chloride monomer, the procedure of Example 1 was generally repeated with the exception that now 28 grams of lauroyl peroxide were employed as the initiator, and the reactor was charged with approximately 10.5 kgm. of vinyl chloride monomer and was vented such as there remained about 10 kgm. of polymerizable vinyl chloride monomer therein. The rotational speed of the helical screw flights during polymerization in this experiment was 120 r.p.m. with the orbital movement of the shaft being approximately 4 r.p.m. The reactor was heated with 200° F. water to a temperature of approximately 138° F. and held at this temperature with a maximum variation being approximately plus or minus 2° F. in temperature. As with Example 1, polymerization was started during the heat-up as evidenced by the formation of a milky slurry. After approximately 2¼ hours after reaching 138° F., a thick paste was observable in the reactor which converted to a wet cake after approximately 3 hours and ten minutes. After approximately five hours, the material had the consistency of a dry, flowable powder and the reaction was finally terminated after approximately six hours by venting the reactor and cooling with tap water. The conversion of material realized was 60.7 weight percent and scalped material had an apparent density of 0.471 with a number average molecular weight of approximately 25,940. The scalped material had a mean weight particle size of 348 microns with the following size analysis:

| U.S. Screen No.: | Weight retained on screen, percent |
|---|---|
| 30 | 1.9 |
| 40 | 24.4 |
| 60 | 47.3 |
| 80 | 8.3 |
| 100 | 4.2 |
| 120 | 5.4 |
| 140 | 2.5 |
| 200 | 3.5 |
| Pan | 2.5 |

EXAMPLE 3

The procedure of Example 2 was again followed with the following exceptions. The rotational speed of the agitator about its axis was 100 r.p.m. with the orbital movement thereof being 3.3 r.p.m. Additionally, polymerization was discontinued by venting the batch and cooling the reactor after approximately 5.4 hours after the batch had been heated to approximately 138° F. After polymerization, a conversion of 65.9 weight percent was realized and the scalped material had a number average molecular weight of 26,700 and an apparent density of 0.426. The mean weight particle size of the scalped material was about 333 microns with the scalped product having the following size analysis:

| U.S. Screen No.: | Weight retained on screen, percent |
|---|---|
| 30 | 3.3 |
| 40 | 29.8 |
| 60 | 34.3 |
| 80 | 8.4 |
| 100 | 4.5 |
| 120 | 5.7 |
| 140 | 3.5 |
| 200 | 5.3 |
| Pan | 5.2 |

A comparison of Examples 2 and 3 with respect to the particle size of the product employed would tend to indicate that the change in the agitator speed had very little effect upon particle size of the product. In fact, if anything, a comparison of these two examples would tend to indicate that lower mean weight particle sizes are obtainable at lower rotational and orbital speeds of the helical agitator during the polymerization process. Additionally, it will be apparent from Examples 1, 2 and 3, that particulate materials were obtained with relatively low orbital rates of movement of the agitator within the reactor and with relatively low rates of rotation of the agitator about its own axis and also that these small particles were obtained by employing the same agitation rates throughout the entire polymerization process. That is, there was no need, in order to obtain particulate materials, that the early stages of the polymerization process be effected under conditions of high agitator speeds, nor was it required that during later stages of the polymerization process that the polymerized material at that point be transferred to a distinct, separate reactor for purposes of further conversion.

EXAMPLE 4

Using an agitator orbital rate within the reactor of about 3.3 revolutions per minute with an agitator rotational rate about its own axis of 100 r.p.m., the procedure of Example 2 was repeated except that 33.6 grams of the lauroyl peroxide (about 0.336 percent lauroyl peroxide based on polymerizable vinyl chloride monomer) was employed. The reactor was vented after holding the mass for five hours at a temperature of about 138° F. The particulate product obtained was then scalped by passage through approximately a 20-mesh screen. This scalped product was then found to have an apparent density of 0.465 gram per cc., a number average molecular weight of about 19,200, and a mean weight particle size of approximately 369 microns.

EXAMPLE 5

The procedure of Example 4 was repeated except that the temperature was about 124° F. (51.5° C.) and a hold time of about 8¾ hours at this temperature was employed. The scalped product was found to have a mean weight particle size of 320 microns, an apparent density of approximately 0.334, and a number average molecular weight of approximately 39,300.

A comparison of Examples 4 and 5 indicates an inverse relationship between the number average molecular weights and the polymerization temperature.

EXAMPLE 6

The procedure of Example 2 was again repeated except in this instance, approximately 27 grams of the lauroyl peroxide was employed (about 0.27 percent based on polymerizable vinyl chloride monomer), and the orbital movement of the agitator within the reactor was approximately 3.7 r.p.m. with the agitator being rotated about its own axis at the rate of 110 r.p.m. The temperature employed was about 131° F. and was run with a hold time of about 9½ hours after reaching this temperature. The rate of polymer formation was approximately 4.3 percent by weight per hour. After scalping through a 20-mesh screen, the particulate material had a number average molecular weight of about 33,500, a mean weight particle size of about 281 microns, and an apparent density of approximately 0.52 grams per cc.

EXAMPLE 7

The procedure of Example 6 was again repeated except the lauroyl peroxide employed was in an amount of 35 grams (about 0.35 weight percent based on total polymerizable vinyl chloride), with the hold time being approximately 7.2 hours after reaching a temperature of about 131° F. It was found that the polymerization rate in this run was approximately 9.4 weight percent per hour in contrast to the lower 4.3 percent rate obtained when using the lower amount of initiator as set forth in Example 6. The scalped product in this example had a number average molecular weight of about 28,900, a mean weight particle size of about 342 microns, and an apparent density of 0.622.

EXAMPLE 8

In order to insure that virtually no oxygen was allowed to enter the reactor, the charger as hereinbefore described with reference to FIG. 1 was employed in this example. Valves 26 and 27 were opened and the reactor was charged, through pipe 22, with about one kilogram of vinyl chloride monomer which was then vented to dryness within the reactor such that no liquid was present, thereby serving to purge the reactor of undesirable oxygen. Subsequently, through pipe 22, there was then charged the major proportion of the vinyl chloride monomer which was to be polymerized, the total amount charged at this time being sufficient to provide approximately 19.5 kilograms of total polymerizable vinyl chloride monomer in the reactor. The charging vessel 24 for the initiator is removed from line 23 by separation at the couplings 25 with valves 26, 27, 28 and 30 closed. With valve 29 in a closed position, vinyl chloride monomer in liquid form is dispensed into charging vessel 24 to purge the vessel of oxygen. As the vinyl chloride monomer is vaporizing, thereby providing vessel 24 with a slight positive pressure of vinyl chloride, the initiator is dispensed into vessel 24. In this instance, the charger was provided with 8 grams of liquid di(secbutyl) peroxydicarbonate, which is the equivalent of about 0.542 gram of active oxygen or about $2.71 \times 10^{-3}$ weight percent of active oxygen based on the total charge. The charging vessel was then inserted into line 23 as shown in the drawings with valves 28, 29 and 30 at this time being in a closed position. An additional amount of vinyl chloride monomer is charged to vessel 24 through line 23 such that this vessel in total contained about 500 grams of monomer. By closing valve 26, opening valves 27 and 28, the pressure of vinyl chloride from the reactor was allowed to reach an equilibrium within charging vessel 24. The main driving means 11 was then activated to provide the helical screw flight agitator with an orbital motion within the reactor of aproximately 4 r.p.m. and with the agitator having a rotational speed about its own axis of approximately 120 r..p.m. With this desired mode of agitation now in effect and with the opening of valves 29 and 30, the initiator, from charging vessel 24 was then allowed to discharge directly onto the liquid vinyl chloride monomer present in the reactor. Valves 27, 29 and 30 were then closed. Using 200° water, the reactor was then heated to a temperature of approximately 125° F. and held at this temperature (within a range of approximately plus or minus 2° F.) for about 7.5 hours. The reactor was then vented and cooled down to obtain a particulate polyvinyl chloride product. A quantity of 36 pounds of free-flowing, particulate material was obtained which was generally equivalent to approximately an 80.4 percent yield based on the 20 kgm. charge. The average conversion rate was approximately 10.7 percent by weight per hour with the 20 mesh-scalped material having an apparent density of about 0.445, a mean weight particle size of about 320 microns, and a number average molecular weight of about 47,500. As in the other examples, as the monomer was being heated, the formation of the polymer was readily apparent because of the noticeable formation of a thin, milky slurry. Continued heating and holding then converted the mass to a thicker slurry, then into what may be termed a wet cake state, and then finally to a dry, particulate material.

EXAMPLE 9

The process of Example 1 is repeated as to reactants charged except that the reactor is of the type described in FIGS. 2 and 3, that is, a reactor wherein the helical screw is moved in an epicyclic motion within the reactor. In conducting the reaction the same techniques and reaction conditions are employed as in Example 1. On completion of the reaction, a good conversion of polyvinyl chloride is observed which has good particle size overall results comparable to Example 1.

While the invention has been described with particularity, it will, of course, be apparent that modifications may be made which, pursuant to the patent statutes and laws, do not depart from the spirit and scope of this invention.

What is claimed is:

1. A method for producing a particulate vinyl chloride polymer by bulk polymerization from vinyl chloride monomer which comprises; placing said monomer in a frusto-conical shape and polymerizing said vinyl chloride monomer into said solid particulate vinyl polymer under conditions of temperature, pressure and catalysis favorable to polymerization while agitating said polymerizing monomer by moving in an orbit-like path at least one agitator disposed within the frusto-conical-shaped monomer, said agitator having a longitudinal axis generally inclined with respect to the vertical axis of said frusto-conical-shaped monomer and having a plurality of helical screw flights thereon about its own axis and, rotating said agitator about its own axis; said orbit-like path having at least a rotational component of motion.

2. The method of claim 1 wherein said orbit-like path of movement also has a radial component to and from the vertical axis of said shape.

3. The method of claim 2 wherein said orbit-like path of movement causes said agitator to come into at least periodic proximity with the exterior of said shape.

4. The method of claim 1 wherein said orbit-like path of movement is circular and said agitator is in continuous proximity with the exterior of said shape.

5. The method of claim 29 wherein said movement is epicyclic.

6. The method of claim 1 wherein the rate of rotation of the agitator about its own axis is substantially constant throughout the entire polymerization period.

7. The method of claim 6 wherein the orbital rate of movement of the agitator axis is substantially constant during the entire polymerization period.

8. The method of claim 7 wherein the rate of rotation of the agitator about its own axis is in the range of about 30 to about 180 r.p.m. and wherein the orbital rate of movement of said agitator axis is between about 0.5 and 6 r.p.m.

9. The method of claim 1 wherein the axis of said agitator is inclined with respect to the vertical axis of said frusto-conical-shaped monomer by an angle of between about 10 degrees to about 25 degrees.

10. The method of claim 9 wherein the axis of said agitator is substantially parallel to the sides of said frusto-conical-shaped monomer and wherein the exteriors of said monomer defining said frusto-conical shape are inclined with respect to the vertical by an angle of between about 10 degrees to about 25 degrees.

11. The method of claim 10 wherein said polymerization is conducted at a temperature between about 100° F. and about 150° F. and a pressure of up to 200 p.s.i.g.

12. The method of claim 11 wherein the edges of said plurality of helical screw flights are disposed no more than about one-half inch from the exterior of said shape.

13. The method of claim 1 wherein two agitators containing a plurality of helical screw-flights are moved during said polymerization reaction, one of which is parallel to a frusto-conical side of said monomer and the other is in a position between the vertical axis and said monomer side.

14. The method according to claim 13 wherein at least one of said helical-screw flights is tapered.

15. A method for the bulk polymerization of vinyl chloride which comprises: providing a sealed, superatmospheric pressure-sustaining polymerization reactor having a frusto-conical portion with a generally vertically disposed axis and including at least one agitator in said frusto-conical portion, said agitator having an axis generally parallel to the side walls of said frusto-conical portion and including a plurality of helical screw flights carried by said agitator; and polymerizing said vinyl chloride monomer in said frusto-conical portion under conditions of temperature, pressure and catalysis favorable to polymerization while simultaneously moving said agitator axis in an orbit-like path about the vertical axis of said frusto-conical portion and simultaneously rotating said agitator about its own axis in a direction to effect a lifting action of material in said frusto-conical portion, the rate of orbital movement being substantially constant throughout the entire polymerization process and the rate of rotational movement of the agitator about its own axis also being substantially constant throughout the entire polymerization process; said orbit-like path having at least a rotational component and causing said agitator to come into at least periodic proximity to the side walls of said frusto-conical portion.

16. The method of claim 15 wherein said orbit-like path of movement also has a radial component to and from the vertical axis of said frusto-conical portion.

17. The method of claim 15 wherein said orbit-like path of movement causes said agitator to come into at least periodic proximity with said frusto-conical portion.

18. The method of claim 17 wherein said orbit-like path of movement is circular and said agitator is in continuous proximity with said frusto-conical portion.

19. The method of claim 17 wherein said movement is epicyclic.

20. The method of claim 15 wherein the side wall of said reactor defining said frusto-conical portion has an angle of inclination with respect to the vertical axis of said portion of between about 10 degrees to about 25 degrees.

21. The method of claim 20 wherein said angle of inclination is between about 15 degrees and about 20 degrees.

22. The method of claim 15 wherein the rate at which the agitator is moved in the orbital path about the axis of the frusto-conical portion is between about 1 to about 5 r.p.m.

23. The method of claim 22 wherein the rate of movement in said orbital path is between about 1½ and about 4 r.p.m.

24. The method of claim 15 wherein the rate of rotation of said agitator about its own axis is between about 30 and about 180 r.p.m.

25. The method of claim 24 wherein the rate of rotation of said agitator about its own axis is between about 60 and 150 r.p.m.

26. The method of claim 25 wherein said rate of rotation is between about 90 and 130 r.p.m.

27. The method of claim 15 wherein the polymerization is effected for a sufficient period of time to form a dry, particulate polymer in said frusto-conical portion.

28. The method of claim 15 wherein two agitators containing a plurality of helical screw flights are rotated during said polymerization reaction; one of which is parallel to a frusto-conical side of said reactor and the other is in a position between about vertical and about the angle of said reactor side.

29. A process for producing a solid particulate vinyl chloride polymer by bulk polymerization from a liquid monomer in which the polymer is insoluble which comprises: enclosing the vinyl chloride monomer in a liquid state at superatmospheric pressure in a sealed superatmospheric pressure-sustaining reactor; having a frusto-conical portion converting said monomer to a particulate polymer under conditions of temperature and superatmospheric pressure favorable to polymerization and in the presence of an effective polymerizing amount of a polymerization initiator, while simultaneously agitating said reacting monomer with an agitator having a plurality of helical screw flights, which agitator is moved in an orbit-like path about the axis of said reactor and also rotated about its longitudinal axis during said conversion; and isolating said solid particulate polymer.

30. The method of claim 29 wherein the orbital and rotational motions are respectively constant during said conversion.

31. The method of claim 30 wherein said frusto-conical portion has a vertically disposed axis and wherein the longitudinal axis of said agitator is inclined to said vertical axis by an angle of about 15° to about 20° and wherein the orbital motion is between about 1 and about 5 r.p.m. and wherein said rotational motion is between about 30 and about 180 r.p.m.

32. The process of claim 1 wherein said vinyl chloride monomer is polymerized in admixture with a copolymerizable monomer.

References Cited
UNITED STATES PATENTS

| | | | |
|---|---|---|---|
| 3,607,849 | 9/1971 | Buning et al. | 260—87.5 |
| 3,354,136 | 11/1967 | Crawford | 260—93.5 |
| 3,438,952 | 4/1969 | Christensen | 260—83.7 |
| 3,469,948 | 9/1969 | Anderson | 23—285 |
| 3,473,896 | 10/1969 | Halder | 23—285 |
| 3,522,227 | 7/1970 | Thomas | 260—92.8 |
| 3,544,280 | 12/1970 | Thomas | 23—290 |
| 3,558,584 | 1/1971 | Thomas | 260—92.8 |
| 3,681,308 | 8/1972 | Irvin | 260—80.78 |

OTHER REFERENCES

Chemical Engineering Catalog (Rheingold Publishing Co.), 1972.

JOSEPH L. SCHOFER, Primary Examiner

J. KIGHT III, Assistant Examiner

U.S. Cl. X.R.

23—285, 288 E; 260—87.5

UNITED STATES PATENT OFFICE
CERTIFICATE OF CORRECTION

Patent No. 3,799,917      Dated March 26, 1974

Inventor(s) Philip P. Rathke

It is certified that error appears in the above-identified patent and that said Letters Patent are hereby corrected as shown below:

Column 2, lines 68-69 - "compopent" should be -- component --;

Column 3, line 51 - "he" should be -- the --;

Column 3, line 66 - "polymerizale" should be -- polymerizable --;

Column 6, line 4 - "type" should be -- types --;

Column 7, line 11 - "persent" should be -- present --;

Column 12, line 68 - "remain" should be -- remained --;

Column 13, line 11 - "reach" should be -- reached --;

Column 13, line 26 - "trhough" should be -- through --;

Claim 1, line 5 - delete "solid";

Claim 1, line 5 - insert -- chloride -- after "vinyl";

Claim 17, line 1 - "claim 15" should be -- claim 16 --.

Signed and sealed this 22nd day of October 1974.

(SEAL)
Attest:

McCOY M. GIBSON JR.
Attesting Officer

C. MARSHALL DANN
Commissioner of Patents